US010300799B2

United States Patent
Kume et al.

(10) Patent No.: US 10,300,799 B2
(45) Date of Patent: May 28, 2019

(54) VEHICLE AND PROTECTOR STRUCTURE

(71) Applicant: HONDA MOTOR CO., LTD., Tokyo (JP)

(72) Inventors: Yasuhisa Kume, Wako (JP); Shuta Fukuda, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 104 days.

(21) Appl. No.: 15/340,989

(22) Filed: Nov. 2, 2016

(65) Prior Publication Data

US 2017/0120760 A1 May 4, 2017

(30) Foreign Application Priority Data

Nov. 2, 2015 (JP) .................................. 2015-215382

(51) Int. Cl.
| | | |
|---|---|---|
| *B60L 11/18* | (2006.01) | |
| *B60K 1/00* | (2006.01) | |
| *B60L 3/00* | (2019.01) | |
| *B60L 53/12* | (2019.01) | |

(52) U.S. Cl.
CPC .............. *B60L 11/182* (2013.01); *B60K 1/00* (2013.01); *B60L 3/0015* (2013.01); *B60L 53/12* (2019.02); *B60Y 2200/91* (2013.01); *B60Y 2400/112* (2013.01); *B60Y 2410/114* (2013.01); *Y02T 10/7005* (2013.01); *Y02T 10/7072* (2013.01); *Y02T 90/122* (2013.01); *Y02T 90/14* (2013.01)

(58) Field of Classification Search
CPC .................................................. B60L 11/182
USPC ........................................................ 174/520
See application file for complete search history.

(56) References Cited

U.S. PATENT DOCUMENTS

| | | | | |
|---|---|---|---|---|
| 6,202,778 B1* | 3/2001 | Mistry | .................... | B60R 19/00 180/69.1 |
| 8,912,687 B2* | 12/2014 | Kesler | .................. | B60L 11/182 307/104 |
| 9,566,872 B2* | 2/2017 | Eger | ..................... | B60L 11/182 |
| 9,932,074 B2* | 4/2018 | Sarhadiangardabad | ..................... B62D 35/02 | |
| 2016/0297306 A1* | 10/2016 | Herzog | .................. | B60L 11/182 |

FOREIGN PATENT DOCUMENTS

| | | |
|---|---|---|
| JP | 2012-257445 | 12/2012 |
| JP | 2013-219861 | 10/2013 |

OTHER PUBLICATIONS

Japanese Office Action for corresponding JP Application No. 2015-215382, Jul. 18, 2017 (w/ English machine translation).

* cited by examiner

*Primary Examiner* — Stanley Tso
(74) *Attorney, Agent, or Firm* — Mori & Ward, LLP

(57) ABSTRACT

A vehicle includes a cover, a front protector, and a rear protector. The cover has a cover lowest portion projecting from the bottom of the vehicle body toward an outside of the vehicle by a first distance. The front protector is provided on a front side of the cover in a front-rear direction. The front protector has a front protector lowest portion projecting from the bottom of the vehicle body toward the outside of the vehicle a second distance longer than the first distance. The rear protector is provided on a rear side of the cover in the front-rear direction. The cover is provided between the front protector and the rear protector in the front-rear direction. The rear protector has a rear protector lowest portion projecting from the bottom toward the outside of the vehicle by a third distance longer than the first distance.

18 Claims, 9 Drawing Sheets

FIG. 7A contact road surface

VEHICLE AND PROTECTOR STRUCTURE

CROSS-REFERENCE TO RELATED APPLICATIONS

The present application claims priority under 35 U. S. C. § 119 to Japanese Patent Application No. 2015-215382, filed Nov. 2, 2015. The contents of this application are incorporated herein by reference in their entirety.

BACKGROUND OF THE INVENTION

Field of the Invention

The present invention relates to a vehicle and a protector structure.

Discussion of the Background

Japanese Laid-Open Patent Publication No. 2012-257445 aims to provide an installation structure of non-contact battery charger to vehicle, which can protect non-contact battery charger (see [0005], Abstract). In order to solve the problem, a supporting member 30 is provided so as to be extended along the longitudinal direction of an electric automobile 1 and fixed on a floor panel 2 of the electric automobile 1, and simultaneously to be fixed with a power receiving unit 10 with a power receiving coil 11 in Japanese Laid-Open Patent Publication No. 2012-257445 (Abstract). Furthermore, a protecting member 40 is provided so as to be extended along the width direction of vehicle of the electric automobile 1 and provided in the rear direction of the power receiving unit 10 in Japanese Laid-Open Patent Publication No. 2012-257445. The protecting member 40 is fixed on the lower surface of the supporting member 30. Accordingly, the protecting member 40 can protect the power receiving unit 10 from the curbstone and the like due to the fact that the protecting member 40 is positioned behind the power receiving unit 10 and below the supporting member 30 when the electric automobile 1 moves backward ([0042]).

SUMMARY OF THE INVENTION

According to a first aspect of the present invention, in a vehicle is configured such that a non-contact electric element for either or both of power transmitting and power receiving is disposed on the lower surface of a vehicle body, the vehicle characterized in that the vehicle has a covered member, a front protecting member, and a rear protecting member. The covered member protects the electric element by covering the electric element. The front protecting member prevents the covered member from contacting with an obstacle on a road surface or the road surface itself in the front direction of the covered member. The rear protecting member prevents the covered member from contacting with the obstacle on the road surface or the road surface itself in the rear direction of the covered member. The lowest portion of the front protecting member or the lowest portion of the rear protecting member are positioned below the lowest portion of the covered member.

According to a second aspect of the present invention, a vehicle includes an electric circuit, a cover, a front protector, and a rear protector. The electric circuit is disposed on a bottom of a vehicle body and configured to transmit and/or to receive electric power wirelessly. The cover covers the electric circuit. The cover has a cover lowest portion projecting from the bottom of the vehicle body toward an outside of the vehicle by a first distance in a height direction of the vehicle. The front protector is provided on a front side of the cover in a front-rear direction of the vehicle perpendicular to the height direction. The front protector has a front protector lowest portion projecting from the bottom of the vehicle body toward the outside of the vehicle in the height direction by a second distance longer than the first distance. The rear protector is provided on a rear side of the cover in the front-rear direction. The cover is provided between the front protector and the rear protector in the front-rear direction. The rear protector has a rear protector lowest portion projecting from the bottom toward the outside of the vehicle in the height direction by a third distance longer than the first distance.

According to a third aspect of the present invention, a protector structure includes a cover, a front protector, and a rear protector. The cover covers an electric circuit and has a cover lowest portion projecting from a bottom of a vehicle body toward an outside of a vehicle by a first distance in a height direction of the vehicle. The front protector is provided on a front side of the cover in a front-rear direction of the vehicle perpendicular to the height direction. The front protector has a front protector lowest portion projecting from the bottom of the vehicle body toward the outside of the vehicle in the height direction by a second distance longer than the first distance. The rear protector is provided on a rear side of the cover in the front-rear direction. The cover is provided between the front protector and the rear protector in the front-rear direction. The rear protector has a rear protector lowest portion projecting from the bottom toward the outside of the vehicle in the height direction by a third distance longer than the first distance.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

The embodiments will now be described with reference to the accompanying drawings, wherein like reference numerals designate corresponding or identical elements throughout the various drawings.

A. One Embodiment

[A-1. Configuration]

(A-1-1. Outline)

Figure 1:
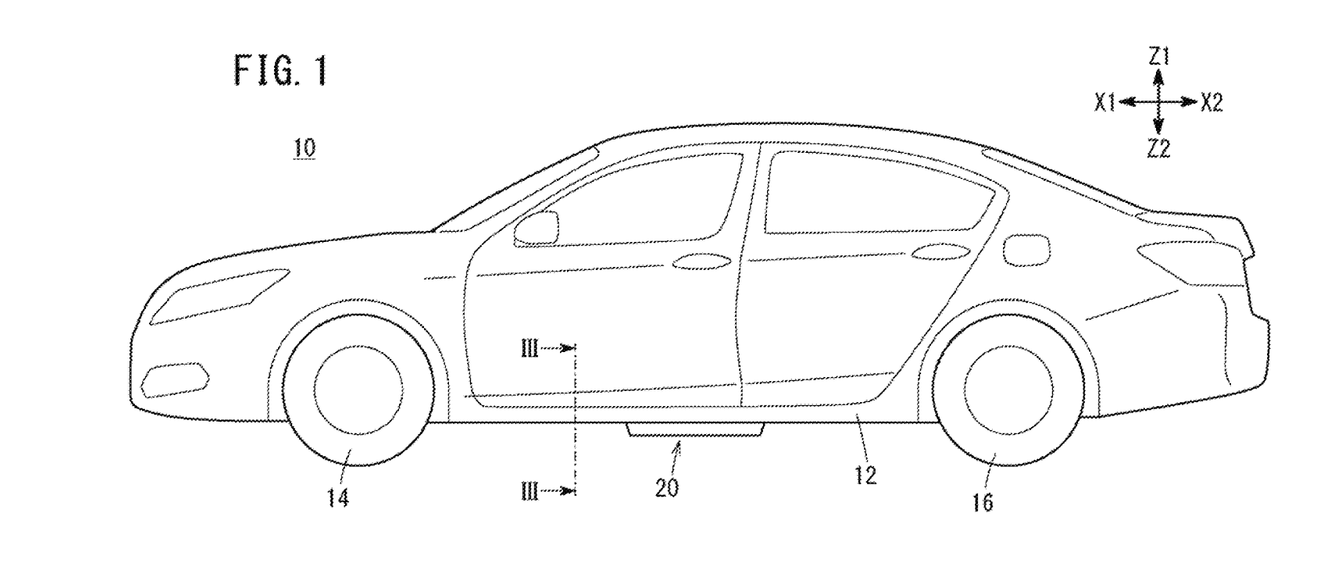
FIG. 1 is a side view of the vehicle related to one embodiment in the present invention.
Figure 2:
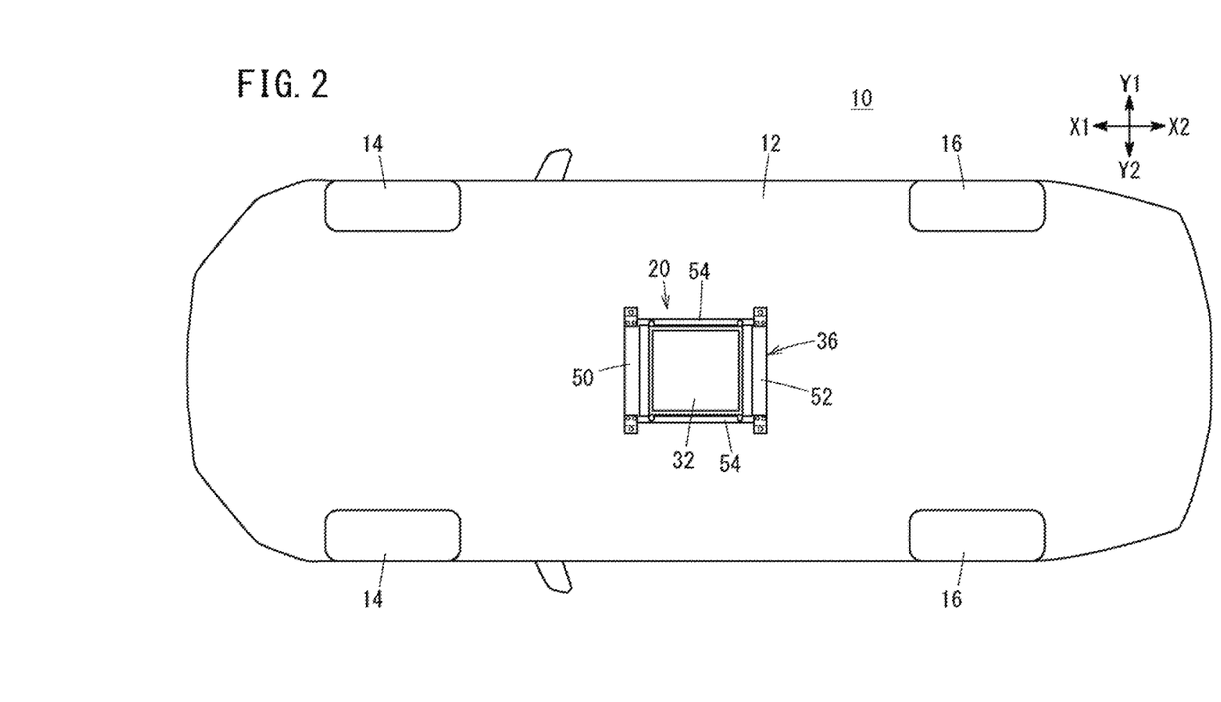
FIG. 2 is a bottom view of the vehicle related to the embodiment.

FIG. 1 is the side view of a vehicle 10 related to the one embodiment of the present invention. FIG. 2 is the bottom view of the vehicle 10 related to the above mentioned embodiment. In FIG. 1 and FIG. 2, X1, X2 show the longitudinal direction of the vehicle 10. Y1, Y2 show the horizontal direction (width direction) of the vehicle 10. Z1, Z2 show the vertical direction of the vehicle 10 (X1 and X2, Y1 and Y2, and Z1 and Z2 show the same directions in other following drawings).

As shown in FIG. 1 and FIG. 2, a power receiving device 20 is disposed on the lower surface of a vehicle body 12 of the vehicle 10. The power receiving device 20 receives electric power from an illustrated outer power transmitting device, and supplies electric power to on-vehicle battery (not shown) and the like inside the vehicle 10.

For example, the vehicle 10 can be an electric automobile in the narrow sense, which travels only using a driving force of a travelling motor powered by the battery. Alternatively, the vehicle 10 may be an electric vehicle which has other driving sources (an engine and the like) in addition to the traveling motor or as an electric vehicle which has other electric power sources (fuel cell and the like) in addition to the battery. Otherwise, the vehicle 10 can be a vehicle which travels only using other driving sources (engine and the like) without the traveling motor. In the case, the on-vehicle battery can be low voltage battery such as 12V battery.

(A-1-2. Power Receiving Device 20)

(A-1-2-1. The Outline of the Power Receiving Device 20)

The power receiving device 20 receives electric power from the outer power transmitting device, and supplies electric power to the on-vehicle battery and the like. In addition to that, or instead of that, the power receiving device 20 may be configured so as to supply electric power from the on-vehicle battery to the outer power transmitting device. In the case, the power receiving device 20 functions as another power transmitting device. Namely, the power receiving device 20 can be configured as a non-contact electric element for either or both of power transmitting and power receiving.

Figure 3:
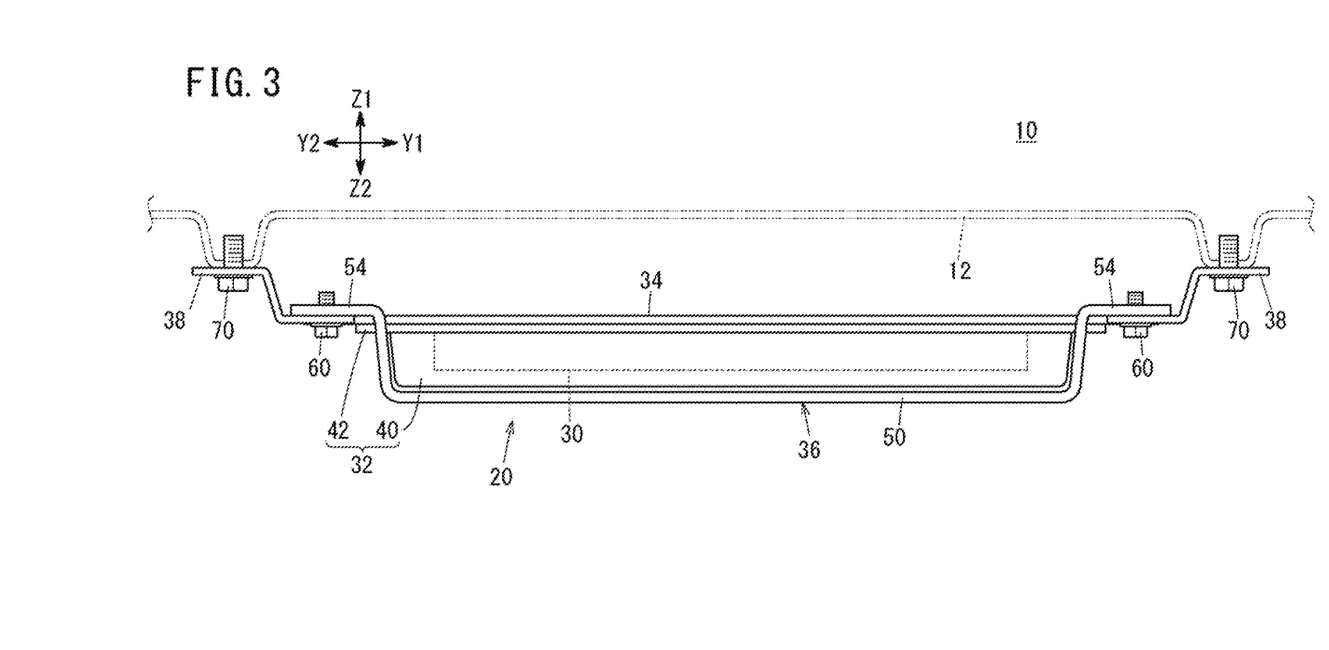
FIG. 3 is a partial sectional view taken along a line in FIG. 1.
Figure 4:
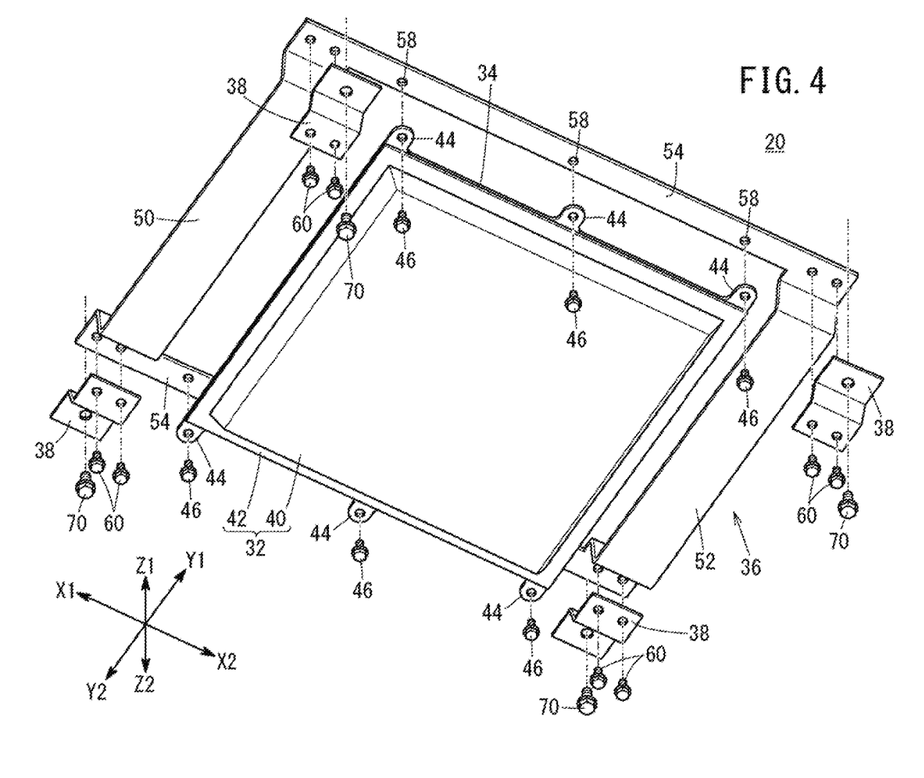
FIG. 4 is an exploded perspective view of the power receiving device in the embodiment.
Figure 5A:
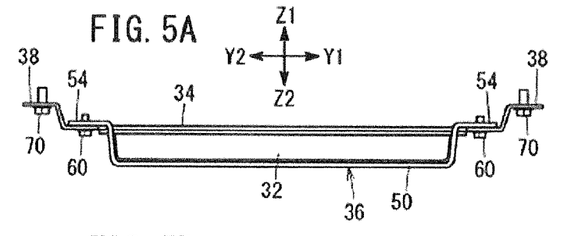
FIG. 5A is a front view of the power receiving device in the embodiment.
Figure 5B:
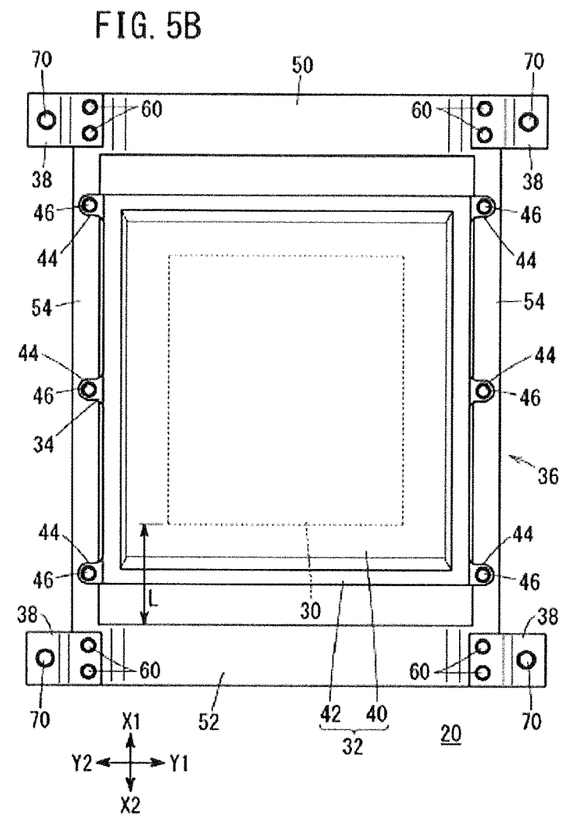
FIG. 5B is a bottom view of the power receiving device in the embodiment.
Figure 5C:
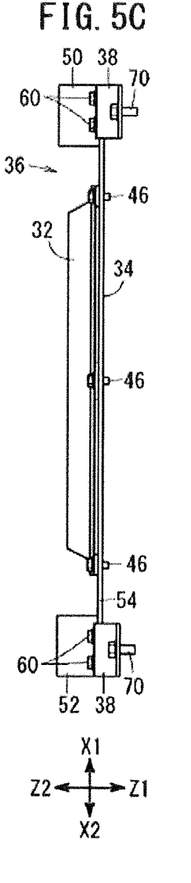
FIG. 5C is a side view of the power receiving device in the embodiment.

FIG. 3 is the local sectional view taken along the III-III line in FIG. 1. FIG. 4 is the exploded perspective view of the power receiving device 20 in the present embodiment. FIG. 5A is the front view of the power receiving device 20 in the present embodiment. FIG. 5B is the bottom view of the power receiving device 20 in the present embodiment. FIG. 5C is the side view of the power receiving device 20 in the present embodiment. As shown in FIG. 1 and FIG. 2, the power receiving device 20 is disposed on the lower surface of the vehicle body 12. The power receiving device 20 in the present embodiment is disposed between the front wheel 14 and the rear wheel 16.

Otherwise, the power receiving device 20 may be disposed between the front wheels 14. Alternatively, the power receiving device 20 can be disposed between the rear wheels 16.

As shown in FIG. 3 to FIG. 5C, the power receiving device has a coil 30 (FIG. 3, FIG. 5B), a coil pad 32, a coil supporting plate 34, a supporting frame 36, and a bracket 38.

(A-1-2-2. Coil 30)

The coil 30 in the present embodiment is a non-contact electric element for receiving power. The coil 30 is configured with a so-called solenoid coil (tubular coil). The coil may be configured with other type of coil. An LC circuit is formed such that an unillustrated condenser is connected to the coil 30 in series or in parallel. Accordingly, magnetic coupling is possible in a so-called magnetic resonance method. Other electric power supply system are also adoptable. As above mentioned, the coil 30 may be used for transmitting power. Moreover, a wiring (not shown) which connects the coil 30 and an electric circuit (on-vehicle battery and the like) inside the vehicle 10 is connected from the upper surface side of the coil 30 to the inside of the vehicle body 12 in a covered state.

(A-1-2-3. Coil Pad 32)

The coil pad 32 is a covered member for protecting the coil 30 by covering the coil 30. The coil pad 32 has a function to prevent the coil 30 from being exposed to the outside. The coil pad is made of resin in the present embodiment. As shown in FIG. 4 and the like, the coil pad 32 basically has a rectangular parallel-piped shape. Namely, the coil pad 32 has a coil housing portion 40 (hereinafter, housing portion 40) which has an approximately rectangular parallel-piped shape and houses the coil 30, an end portion 42 (installation portion) for fixing the coil supporting plate 34 with the coil pad 32. In order to prevent the coil 30 from being exposed to the outside, the shape of the coil pad should be formed so as to match the arrangement of the coil 30. From this view point, the coil pad 32 (the housing portion 40 and the end portion 42) may be formed in other shapes. For example, the coil pad 32 may basically have a column shape.

(A-1-2-4. Coil Supporting Plate 34)

The coil supporting plate 34 (hereinafter, supporting plate 34) is a plate like member supporting the coil 30 and the coil pad 32. An installation portion 44 is formed on the supporting plate 34 in the present embodiment so as to fix the supporting plate with the supporting frame 36 through a bolt 46. In the bottom view (FIG. 5B), the supporting plate 34 has an approximately same size as the coil pad 32 except the installation portion 44.

(A-1-2-5. Supporting Frame 36)

Figure 6A:
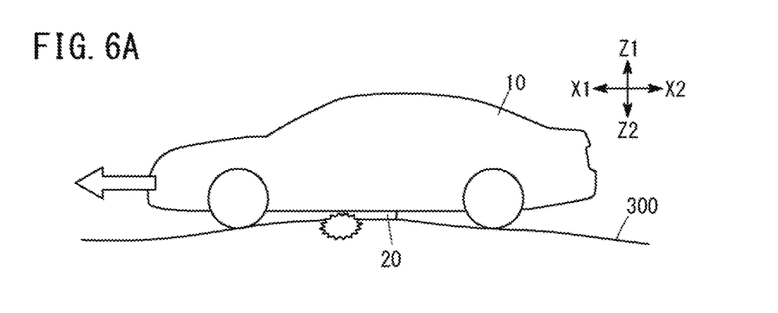
FIG. 6A is a view simply showing a state that the power receiving device contacts with the road surface when the vehicle related to the embodiment travels forward.
Figure 6B:
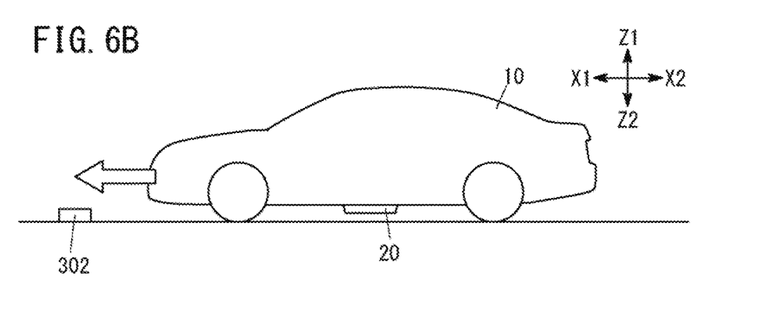
FIG. 6B is a view simply showing a state that the power receiving device is going to contact with the obstacle on the road surface when the vehicle related to the embodiment travels forward.

The supporting frame 36 supports the coil 30, the coil pad 32, and the coil supporting plate 34. The supporting frame 36 in the present embodiment has a function to prevent the coil pad (or the coil 30) from contacting with an obstacle 302 on a road surface 300 or the road surface 300 itself (FIG. 6A and FIG. 6B). The supporting frame 36 is a member with higher rigidity but is a member with lower elasticity than those of the bracket 38 (for example, metal made or FRP made). In the bottom view (FIG. 5B), the supporting frame 36 surrounds the coil pad 32 and the supporting plate 34. In other words, the supporting frame 36 is larger than the coil pad 32 and the supporting plate 34, except an installation portion 44 of the supporting plate 34.

As shown in FIG. 2 to FIG. 5C, the supporting frame 36 has a front protecting portion 50, a rear protecting portion 52, and a connecting portion 54.

The front protecting portion 50 prevents the coil pad 32 from contacting with the obstacle 302 on the road surface 300 or the road surface 300 itself in the front direction of the coil pad 32. As shown in FIG. 3, FIG. 4 and the like, the front protecting portion 50 is projected from the connecting portion 54 to the lower direction of the vehicle 10. The front protecting portion 50 is fixed on the lower surface of the vehicle body 12 through the bracket 38 (see FIG. 3 or FIG. 4).

The rear protecting portion 52 prevents the coil pad 32 from contacting with the obstacle 302 on the road surface 300 or the road surface 300 itself in the rear direction of the coil pad 32. As same as the front protecting portion 50, the rear protecting portion 52 projects from the same level as the connecting portion 54 to the lower direction of the vehicle 10. The rear protecting portion 52 is fixed on the lower surface of the vehicle body 12 through the bracket 38 (see FIG. 4).

The connecting portion 54 connects the front protecting portion 50 and the rear protecting portion 52. The connecting portions 54 in the present embodiment are configured as two parts which connect an end portion of the front protecting portion 50 and an end portion of the rear protecting portion 52. However, for example, the variation is not limited to this from the view point to connect the front protecting portion 50 and the rear protecting portion 52. For example, it is also possible to provide at least one or more than three of the connecting portions 54.

As shown in FIG. 4, a screw hole 58 is formed on the connecting portion 54 so as to engage the bolt 46. The bolt 46 and the screw hole 58 are used for fixing the installation portion 44 of the supporting plate 34 on the connecting portion 54. Accordingly, the coil 30, the coil pad 32, and the supporting plate 34 are fixed on the connecting portion 54. Moreover, unillustrated nuts may be used by combining with the bolts 46 (same as following bolts 60, 70).

As above mentioned, the supporting frame 36 is a single member which has the front protecting portion 50, the rear protecting portion 52, and the connecting portion 54. The supporting frame 36 in the present embodiment is made of metal. For example, materials (aluminum and the like) with relatively low permeability can be used as a material for the supporting frame 36. Accordingly, using the supporting frame 36 as magnetic shielding parts can suppress the deterioration of power transmitting efficiency.

As shown in FIG. 3, FIG. 5A, and FIG. 5B, the lowest portion of the front protecting portion 50 and the lowest portion of the rear protecting portion 52 are positioned below the lowest portion of the coil pad 32. More specifically, when viewed in the longitudinal direction (FIG. 3, FIG. 5A) of the vehicle 10, the profile line of the front protecting portion 50 and the profile line of the rear protecting portion 52 are positioned below the profile line of the coil housing portion 40 of the coil pad 32 in the width direction and the lower direction of the vehicle 10.

Moreover, when viewed in the longitudinal direction of the vehicle 10, the profile line of the front protecting portion 50 and the profile line of the rear protecting portion 52 are positioned below the profile line of the lower surface of the coil pad 32 (FIG. 3 to FIG. 5C).

As shown in FIG. 5B, in the longitudinal direction of the vehicle 10, a distance L between the coil 30 and the rear protecting portion 52 is set at a distance so as not to block the magnetic flux. A distance between the coil 30 and the front protecting portion 50 is similarly set.

(A-1-2-6. Bracket 38)

The bracket 38 is a member for fixing the supporting frame 36 on the vehicle body 12. The bracket 38 is a member with lower rigidity or is a member with higher elasticity (for example, metal made or FRP made) than those of the supporting frame 36 (the front protecting portion 50 and the rear protecting portion 52). The bracket 38 functions as a plate spring.

As shown in FIG. 4 and the like, the bolt 60 is used for fixing the supporting frame 36 and the bracket 38. Moreover, the bolts 70 are used for fixing the bracket 38 on the vehicle body 12.

[A-2. Function and Effect of the Bracket 38]

Figure 7A:
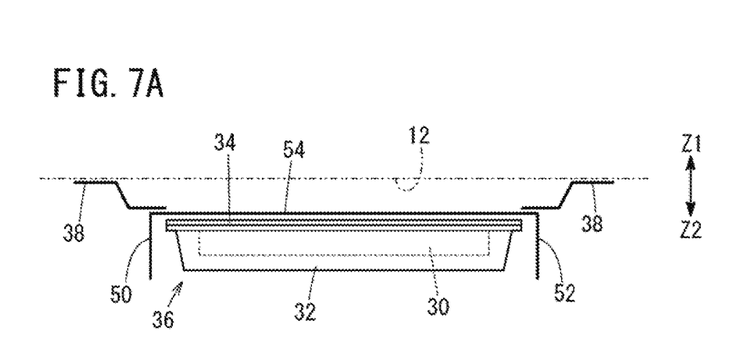
FIG. 7A is a view simply showing a state before the power receiving device in the embodiment contacts with the road surface.
Figure 7B:
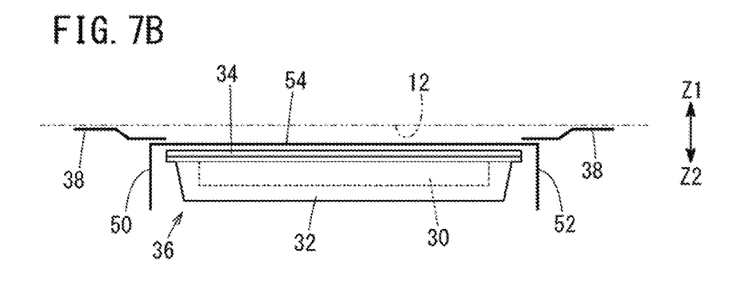
FIG. 7B is a view simply showing a state after the power receiving device in the embodiment contacts with the road surface.

Next, the function and the effect of the bracket 38 in the present embodiment will be explained. FIG. 6A is the view simply showing the state that the power receiving device 20 contacts with the road surface 300 when the vehicle 10 related to the present embodiment travels forward. FIG. 6B is the view simply showing the state that the power receiving device 20 is going to contact with the obstacle 302 on the road surface 300 when the vehicle 10 related to the present embodiment travels forward. FIG. 7A is the view simply showing the state before the power receiving device 20 in the present embodiment contacts with the road surface 300. FIG. 7B is the view simply showing the state after the power receiving device 20 in the present embodiment contacts with the road surface 300. Moreover, FIG. 7A and FIG. 7B show the front protecting portion 50 and the rear protecting portion 52. Note that the direction of the bracket 38 is changed, in order to show an appearance of deformation of the bracket 38.

When the power receiving device 20 of the vehicle 10 contacts with the road surface 300 while travelling forward (see FIG. 6A), the bracket 38 shifts from the state in FIG. 7A to the state in FIG. 7B. For example, the bracket 38 is in a state to be extended to relatively lower direction before the power receiving device 20 contacts with the road surface 300.

Meanwhile, the bracket 38 receives the impact force by contacting with the road surface 300 and absorbs the impact force by the deformation after the power receiving device 20 contacts with the road surface 300. Accordingly, the coil 30, the coil pad 32, the coil supporting plate 34, the supporting frame 36 are relatively less damaged. Moreover, the bracket 38 can be deformed in both cases of elastic deformation and plastic deformation.

When the power receiving device contacts with the obstacle 302 on the road surface 300 (see FIG. 6B), the bracket is in the same state.

[A-3. Effect of the Present Embodiment]

As explained above, according to the present embodiment, the front protecting portion 50 (front protecting member) is disposed in the front direction of the coil pad 32 (covered member). The rear protecting portion 52 (rear protecting member) is disposed in the rear direction of the coil pad 32. Each lowest portion is positioned below the lowest portion of the coil pad 32 (FIG. 3, FIG. 5A, and FIG. 5B). Accordingly, for example, when the front protecting portion 50 and the rear protecting portion 52 are made of metal, the coil pad 32 and the coil 30 can be protected from contacting with the obstacle 302 on the road surface 300 or the road surface 300 itself when the vehicle 10 travels forward. Simultaneously, the coil 30 (electric element) can keep the function to transmit and receive electric power with the outer apparatus (see FIG. 1 to FIG. 5C). Moreover, the front protecting portion 50 and the rear protecting portion 52 are disposed so as to match the arrangement of the coil 30. The arrangement can be set in a relatively flexible manner.

In the present embodiment, when viewed in the longitudinal direction of the vehicle 10, the profile line of the front protecting portion 50 (front protecting member) and the profile line of the rear protecting portion 52 (rear protecting member) are positioned below the profile line of the coil housing portion 40 in the width direction and lower direction of the vehicle 10 (FIG. 3 and the like). Accordingly, it becomes easier to prevent the coil pad 32 covering the coil 30 (electric element) from contacting with the obstacle 302 on the road surface 300 or the road surface 300 itself from the front side, the rear side, and the lower side of the vehicle 10.

In the present embodiment, the coil pad 32 (covered member) basically has a rectangular parallel-piped shape (FIG. 3 to FIG. 5C and the like). Moreover, when viewed in the longitudinal direction of the vehicle 10, the profile line of the front protecting portion 50 (the front protecting member) and the profile line of the rear protecting portion 52 (the rear protecting member) are positioned below the profile line of the lower surface of the coil pad 32 (FIG. 3, FIG. 5A, FIG. 5B, and the like). Accordingly, it becomes easier to prevent the coil pad 32 covering the coil 30 (electric element) from contacting with the obstacle 302 on the road surface 300 or the road surface 300 itself from the front side, the rear side, and the lower side of the vehicle 10.

In the present embodiment, the vehicle 10 has the connecting portion 54 (connecting member) connecting the front protecting portion 50 and the rear protecting portion 52 (FIG. 4, and the like). Moreover, the supporting plate 34 (supporting member) supporting the coil 30 (electric element) is fixed on the connecting portion 54 (FIG. 3, and the like). Accordingly, it becomes possible to install the coil 30, the coil pad 32, the supporting plate 34, the front protecting portion 50, the rear protecting portion 52, and the connecting portion 54 to the vehicle 10 in an assembled state. Accordingly, the workload when these parts are installed on the vehicle 10 can be reduced.

In the present embodiment, the front protecting portion 50, the rear protecting portion 52, and the connecting portion are formed as a single member (FIG. 4 and the like). Accordingly, the number of assembly process can be reduced.

In the present embodiment, the front protecting portion 50 and the rear protecting portion 52 are fixed on the lower surface of the vehicle body 12 through the bracket 38 (FIG. 3 and the like). The rigidity of the bracket 38 is lower than those of the front protecting portion 50 and the rear protecting portion 52. Accordingly, when the front protecting portion 50 and the rear protecting portion 52 contact with the obstacle 302 on the road surface 300 or the road surface 300 itself, the bracket 38 can be more easily deformed than the front protecting portion 50 and the rear protecting portion 52 themselves. Then, when the bracket 38 is deformed, the repair is completed by replacing the bracket 38 itself in most cases. Accordingly, for example, when the front protecting member 50 and the rear protecting member 52 are more expensive than the bracket 38 or are difficult to obtain, repairing the bracket is easier than repairing the front protecting member and the rear protecting member from the view of the workload and cost.

In the present embodiment, the bracket 38 is configured with the elastic member. (FIG. 7B). Accordingly, when the front protecting portion 50 and the rear protecting portion 52 contact with the obstacle 302 on the road surface 300 or the road surface 300 itself, the bracket 38 can absorb the impact force. Accordingly, the absorbing property of the impact force can be improved without giving the elasticity to the front protecting member and the rear protecting member.

B. Variation

Moreover, the present invention is not limited to the above-mentioned embodiment. It is certain that various configurations are adoptable based on the description of the present specification. For example, the following configurations are adoptable.

[B-1. Subject of Application]

In the above-mentioned embodiment, the power receiving device 20 is applied to the vehicle 10 (FIG. 1 to FIG. 3). However, for example, the variation is not limited to this from the view point that either or both of the front protecting portion 50 and the rear protecting portion 52 are used for protecting the coil 30 (electric element) and the coil pad 32 (covered member). For example, the power receiving device 20 (electric power device) can be used for other moving bodies (vessels and aircraft and the like). Or, the power receiving device 20 may be applied to manufacturing apparatuses which need power transmitting or power receiving, robots, or home electric appliances.

[B-2. Coil 30 (Electric Element)]

In the above-mentioned embodiment, the coil 30 is a protection target of the front protecting portion 50 and the rear protecting portion 52 (FIG. 4 and the like). However, for example, the variation is not limited to this from the view point to protect the non-contact electric element for either or both of power transmitting and power receiving. For example, in addition to or instead of the coil 30, a terminal block or a rectifier element may be protection targets.

[B-3. Supporting Frame 36]

(B-3-1. Whole of the Supporting Frame 36)

In the above-mentioned embodiment, the front protecting portion 50, the rear protecting portion 52 and the connecting portion 54 are configured as a single member (FIG. 4 and the like). However, the front protecting portion 50, the rear protecting portion 52, and the connecting portion 54 are formed as respective members, and can be connected with connecting tool such as bolt and the like.

(B-3-2. Front Protecting Portion 50 and Rear Protecting Portion 52)

In the above-mentioned embodiment, the front protecting portion 50 and the rear protecting portion 52 are provided for protecting the coil 30 and the coil pad 32 (FIG. 4 and the like). However, for example, it is possible to configure such that only the front protecting portion 50 is provided without the rear protecting portion 52, from the view point to protect the front direction of the coil 30 and the coil pad 32. Similarly, it is also possible to configure such that only the rear protecting portion 52 is provided without the front protecting portion 50, from the view point to protect the rear direction of the coil 30 and the coil pad 32.

(B-3-3. Connecting Portion 54)

In the above-mentioned embodiment, the connecting portion is tabular (FIG. 4 and the like). However, the connecting portion 54 may be other shapes (for example, column shape), from the view point to connect the front protecting portion 50 and the rear protecting portion 52.

In the above-mentioned embodiment, the two connecting portions 54 are provided (FIG. 4 and the like). However, it may be possible to provide at least one or more than three of the connecting portions 54 from the view point to connect the front protecting portion 50 and the rear protecting portion 52.

In the above-mentioned embodiment, the connecting portions 54 are provided so as to connect the front protecting portion 50 and the rear protecting portion 52 (FIG. 4 and the like). However, for example, it is possible to configure without the connecting portion 54 by focusing on the respective functions of the front protecting portion 50 and the rear protecting portion 52. In the case, the front protecting portion 50 and the rear protecting portion 52 are fixed on the vehicle body 12 or the bracket 38, respectively.

In the above-mentioned embodiment, the connecting portion 54 is fixed on the supporting plate 34 (FIG. 4, FIG. 5B and the like). However, for example, the variation is not limited to this from the view point to support the coil 30 or the coil pad 32. For example, the connecting portion 54 may be directly fixed with the coil 30 or the coil pad 32.

[B-4. Bracket 38]

Figure 8:
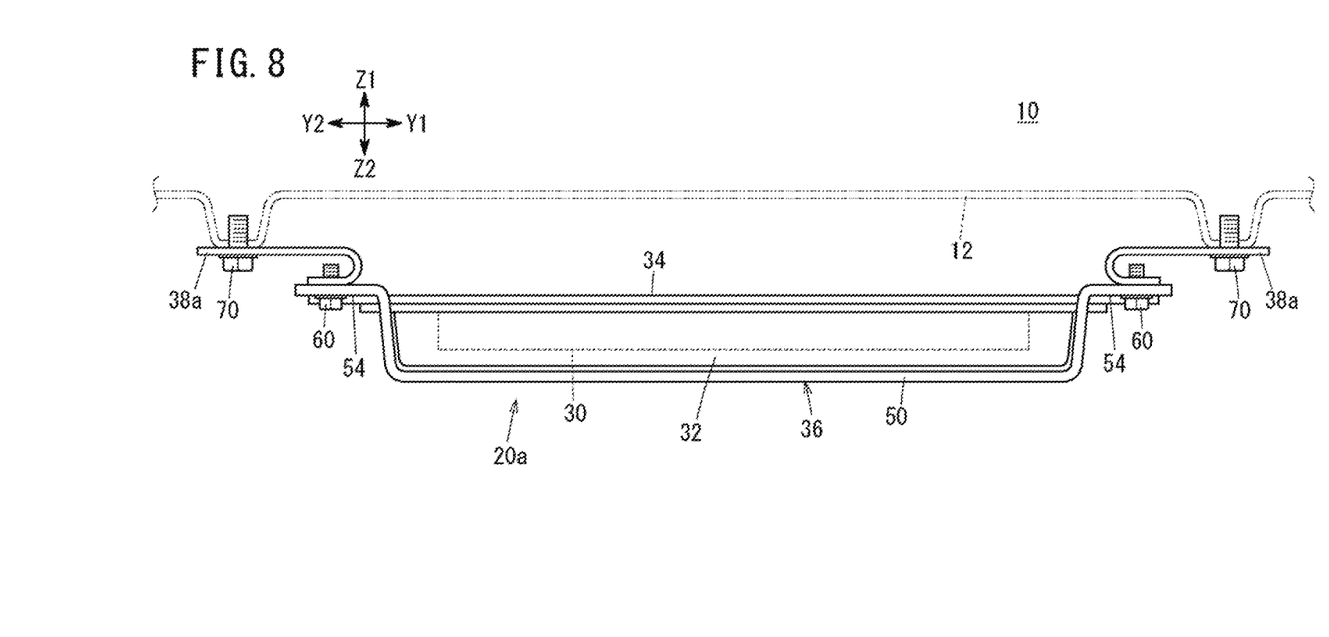
FIG. 8 is a back view of the power receiving device with a bracket, which is related to a first variation.
Figure 9:
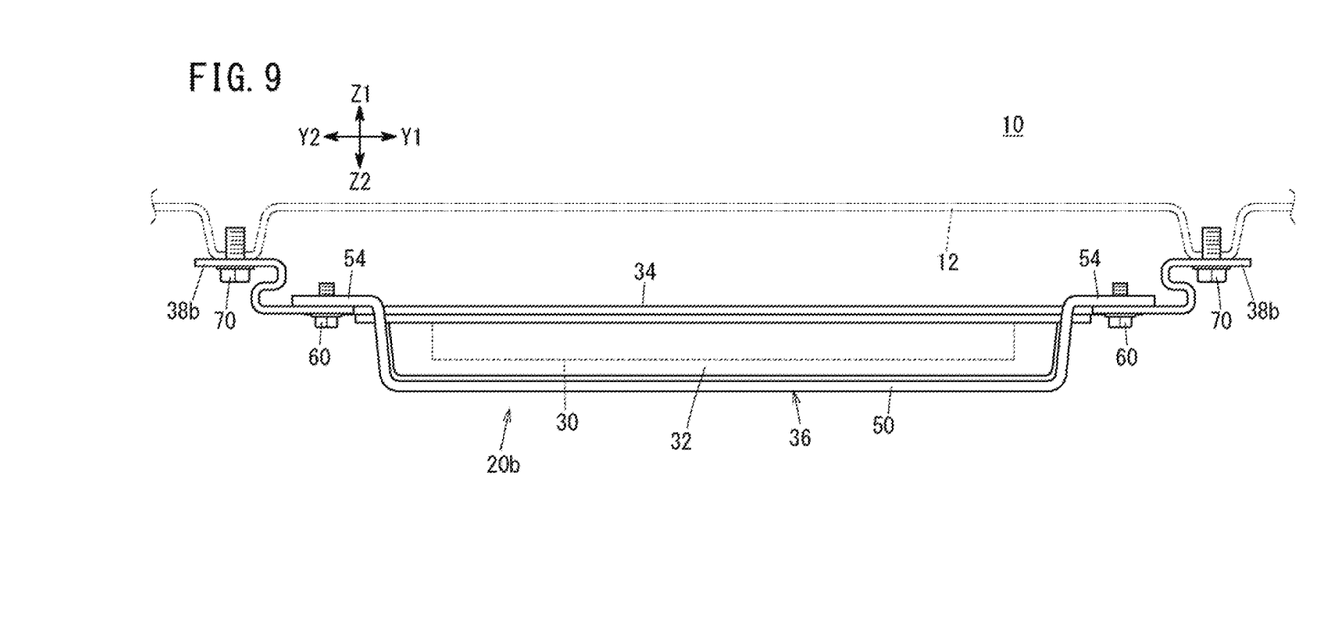
FIG. 9 is a back view of the power receiving device with a bracket, which is related to a second variation.

In the above-mentioned embodiment, the shape of the bracket 38 is shown in FIG. 3 to FIG. 5C. However, the shape of the bracket 38 is not limited to this. FIG. 8 is the back view of the power receiving device 20a with the bracket 38a which is related to the first variation. FIG. 9 is the back view of the power receiving device 20b with a bracket 38b which is related to the second variation. The brackets 38a, 38b can have the same effect as the bracket 38 in the above-mentioned embodiment.

In the above-mentioned embodiment, the bracket 38 is provided (FIG. 4 and the like). However, for example, it is possible to configure without the bracket 38 by focusing on either or both of the function of the front protecting portion 50 and the function of the rear protecting portion 52.

The vehicle related to the present embodiment is configured such that a non-contact electric element for either or both of power transmitting and power receiving is disposed on the lower surface of the vehicle body. The vehicle is characterized in that a covered member protecting the electric element by covering the electric element, a front protecting member preventing the covered member from contacting with an obstacle on a road surface or the road surface itself in the front direction of the covered member, a rear protecting member preventing the covered member from contacting with the obstacle on the road surface or the road surface itself in the rear direction of the covered member, and the lowest portion of the front protecting member or the lowest portion of the rear protecting member are positioned below the lowest portion of the covered member.

According to the present embodiment, a front protecting member is disposed in the front direction of the covered member. The rear protecting member is disposed in the rear direction of the covered member. The lowest portion of each protecting member is positioned below the lowest portion of the covered member. Accordingly, even if the front protecting member and the rear protecting member are made of metal, the electric element can keep the function to transmit and receive power to the outer apparatus. Simultaneously, the covered member and the electric element can be prevented from contacting with the obstacle on the road surface or the road surface itself when the vehicle travels forward. Moreover, the electric element can be installed so as to be relatively free due to the fact that the front protecting member and the rear protecting member are disposed depending on the installed position of the electric element.

The covered member may have a housing portion housing the electric element. When viewed in the longitudinal direction of the vehicle, the profile line of the front protecting member and the profile line of the rear protecting member may be positioned below the profile line of the housing portion in the width direction and the lower direction of the vehicle. Accordingly, the covered member covering the electric element can be easily prevented from contacting with the obstacle on the road surface or the road surface itself from the front side, the rear side or the lower side of the vehicle.

The covered member basically has a rectangular parallelpiped shape, when viewed in the longitudinal direction of the vehicle, the profile line of the front protecting member and the profile line of the rear protecting member may be positioned below the profile line of the lower surface of the covered member. Accordingly, the covered member covering the electric element can be easily prevented from contacting with the obstacle on the road surface or the road surface itself from the front side, the rear side or the lower side of the vehicle.

The vehicle may have at least one of connecting members which connect the front protecting member and the rear protecting member. The electric element, or the supporting member supporting the electric element, or the covered member may be fixed on the connecting member. Accordingly, it becomes possible to install the electric element, the supporting member (as necessary), the covered member, the front protecting member, the rear protecting member, and the connecting member to the vehicle in an assembled state. Therefore, the workload for installing these parts can be reduced.

The front protecting member, the rear protecting member, and the connecting member may be formed as a single member. Accordingly, the number of assembly process can be reduced.

The front protecting member and the rear protecting member may be fixed on the lower surface of the vehicle body through a bracket. The rigidity of the bracket may be lowered than the rigidity of the front protecting member and the rigidity of the rear protecting member. Accordingly, when the front protecting member and the rear protecting member contact with the obstacle on the road surface or the road surface itself, the bracket can be more easily deformed than the front protecting member and the rear protecting member themselves.

Then, when the bracket is deformed, the repair is completed by replacing the bracket 38 itself in most cases. Accordingly, for example, when the front protecting member and the rear protecting member are more expensive than the bracket or are difficult to obtain, repairing the bracket is easier than repairing the front protecting member and the rear protecting member from the view of the workload and cost.

The bracket may be configured with the elastic member. Accordingly, when the front protecting member and the rear protecting member contact with the obstacle on the road surface or the road surface itself, the bracket can absorb the impact force. Accordingly, the absorbing property of the impact force can be improved without giving the elasticity to the front protecting member and the elasticity of the rear protecting member.

The electric element can be configured with such as a coil, a terminal block or a rectifier element. For example, the covered member can be made of resin. For example, the front protecting member and the rear protecting member can be made of metal or made of fiber reinforced plastics (FRP).

According to the present embodiment, the electric element (coil and the like) can be protected when the vehicle travels forward.

Obviously, numerous modifications and variations of the present invention are possible in light of the above teachings. It is therefore to be understood that within the scope of the appended claims, the invention may be practiced otherwise than as specifically described herein.

What is claimed is:

1. In a vehicle configured such that a non-contact electric element for either or both of power transmitting and power receiving is disposed on the lower surface of a vehicle body,
    said vehicle characterized in that said vehicle has
        a covered member protecting said electric element by covering said electric element, a front protecting member preventing said covered member from contacting with an obstacle on a road surface or said road surface itself in a front direction of said covered member, said front protecting member extending along a front side of said covered member, a rear protecting member preventing said covered member from contacting with the obstacle on said road surface or said road surface itself in a rear direction of said covered member, said rear protecting member extending along a rear side of said covered member, the lowest portion of said front protecting member or the lowest portion of said rear protecting member are positioned below the lowest portion of said covered member, the vehicle characterized in that said front protecting member has an elongated shape that longitudinally extends in a width direction of the vehicle, and said rear protecting member has an elongated shape that longitudinally extends in the width direction of the vehicle, the vehicle characterized in that said front protecting member and said rear protecting member are fixed on the lower surface of said body through a bracket, and the rigidity of said bracket is lower than the rigidity of said front protecting member and the rigidity of said rear protecting member.

2. In the vehicle mentioned in claim 1, the vehicle characterized in that said covered member has a housing portion housing said electric element, and the profile line of said rear protecting member and the profile line of said front protecting member are positioned below the profile line of said housing portion in the width direction and a lower direction of said vehicle when viewed in a longitudinal direction of said vehicle.

3. In the vehicle mentioned in claim 1, the vehicle characterized in that said covered member has a rectangular parallel-piped shape, and the profile line of said front protecting member and the profile line of said rear protecting member are positioned below the profile line of the lower surface of said covered member.

4. In the vehicle mentioned in claim 1, the vehicle characterized in that said vehicle has connecting members that each have an elongated shape that longitudinally extends in a longitudinal direction of the vehicle, and said connecting members connecting said front protecting member and said rear protecting member to form a rectangular shaped frame with an open central area when viewed in a height direction of the vehicle.

5. In the vehicle mentioned in claim 4, the vehicle characterized in that said front protecting member, said rear protecting member, and said connecting members are formed as a single member.

6. In the vehicle mentioned in claim 4, the vehicle characterized in that said electric element, a supporting member supporting said electric element, or said covered member is fixed on said connecting members.

7. In the vehicle mentioned in claim 1, the vehicle characterized in that said bracket is configured with an elastic member.

8. In the vehicle mentioned in claim 1, the vehicle characterized in that said electric element is a coil, said covered member is made of resin, and said front protecting member and said rear protecting member are made of metal.

9. A vehicle comprising:

an electric circuit disposed on a bottom of a vehicle body and configured to transmit and/or to receive electric power wirelessly;

a cover covering the electric circuit and having a cover lowest portion projecting from the bottom of the vehicle body toward an outside of the vehicle by a first distance in a height direction of the vehicle;

a front protector provided on a front side of the cover in a front-rear direction of the vehicle perpendicular to the height direction, the front protector having a front protector lowest portion projecting from the bottom of the vehicle body toward the outside of the vehicle in the height direction by a second distance longer than the first distance, the front protector extending along the front side of the cover; and a rear protector provided on a rear side of the cover in the front-rear direction, the cover being provided between the front protector and the rear protector in the front-rear direction, the rear protector having a rear protector lowest portion projecting from the bottom toward the outside of the vehicle in the height direction by a third distance longer than the first distance, the rear protector extending along the rear side of the cover, wherein the front protector has an elongated shape that longitudinally extends in a width direction of the vehicle, wherein the rear protector has an elongated shape that longitudinally extends in the width direction of the vehicle, wherein the front protector and the rear protector are fixed on a bottom surface of the vehicle body through a bracket, and wherein rigidity of the bracket is lower than rigidity of the front protector and rigidity of the rear protector.

10. The vehicle according to claim 9, wherein the cover has a housing portion housing the electric circuit, and a profile line of the rear protector and a profile line of the front protector are positioned below a profile line of the housing portion in the width direction and the height direction viewed in the front-rear direction.

11. The vehicle according to claim 9, wherein the cover has a rectangular parallel-piped shape, and a profile line of the front protector and a profile line of the rear protector are positioned below a profile line of a lower surface of the cover.

12. The vehicle according to claim 9, further comprising connecting members that each have an elongated shape that longitudinally extends in the front-rear direction of the vehicle, wherein the connecting members connect the front protector and the rear protector to form a rectangular shaped frame with an open central area when viewed in the height direction of the vehicle.

13. The vehicle according to claim 12, wherein the front protector, the rear protector, and the connecting members are formed as a single member.

14. The vehicle according to claim 12, wherein the electric circuit, a supporting member supporting the electric circuit, or the cover is fixed on the connecting members.

15. The vehicle according to claim 9, wherein the bracket is configured with an elastic member.

16. The vehicle according to claim 9, wherein
the electric circuit includes a coil,
the cover is made of resin, and
the front protector and the rear protector are made of metal.

17. A protector structure comprising:
a cover to cover an electric circuit and having a cover lowest portion projecting from a bottom of a vehicle body toward an outside of a vehicle by a first distance in a height direction of the vehicle;
a front protector provided on a front side of the cover in a front-rear direction of the vehicle perpendicular to the height direction, the front protector having a front protector lowest portion projecting from the bottom of the vehicle body toward the outside of the vehicle in the height direction by a second distance longer than the first distance, the front protector extending along the front side of the cover; and
a rear protector provided on a rear side of the cover in the front-rear direction, the cover being provided between the front protector and the rear protector in the front-rear direction, the rear protector having a rear protector lowest portion projecting from the bottom toward the outside of the vehicle in the height direction by a third distance longer than the first distance, the rear protector extending along the rear side of the cover,
wherein the front protector has an elongated shape that longitudinally extends in a width direction of the vehicle,
wherein the rear protector has an elongated shape that longitudinally extends in the width direction of the vehicle,
wherein the front protector and the rear protector are fixed on a bottom surface of the vehicle body through a bracket, and
wherein rigidity of the bracket is lower than rigidity of the front protector and rigidity of the rear protector.

18. The protector structure according to claim 17, further comprising connecting members that each have an elongated shape that longitudinally extends in the front-rear direction of the vehicle,
wherein the connecting members connect the front protector and the rear protector to form a rectangular shaped frame with an open central area when viewed in the height direction of the vehicle.

* * * * *